US012196395B2

(12) United States Patent
Nichols

(10) Patent No.: US 12,196,395 B2
(45) Date of Patent: Jan. 14, 2025

(54) CLIP AND SEAL HOLIDAY LIGHT GROUND STAKES

(71) Applicant: Tim Nichols, Dallas, TX (US)

(72) Inventor: Tim Nichols, Dallas, TX (US)

( * ) Notice: Subject to any disclaimer, the term of this patent is extended or adjusted under 35 U.S.C. 154(b) by 0 days.

(21) Appl. No.: 17/743,719

(22) Filed: May 13, 2022

(65) Prior Publication Data

US 2023/0366528 A1 Nov. 16, 2023

(51) Int. Cl.

| | |
|---|---|
| ***F21V 21/08*** | (2006.01) |
| ***F21V 21/088*** | (2006.01) |
| ***F21V 31/00*** | (2006.01) |
| ***F21W 131/10*** | (2006.01) |

(52) U.S. Cl.

CPC ........ *F21V 21/0824* (2013.01); *F21V 31/005* (2013.01); *F21V 21/088* (2013.01); *F21W 2131/10* (2013.01)

(58) Field of Classification Search

CPC .... F21V 21/08; F21V 21/0824; F21V 21/088; F21V 21/0885; F21V 31/00; F21V 31/005; F21V 19/003; F21V 19/004; F21W 2131/10; F21W 2131/109; F21S 4/00; F21S 4/10; F21S 4/15

See application file for complete search history.

(56) References Cited

U.S. PATENT DOCUMENTS

| | | | | | |
|---|---|---|---|---|---|
| 1,791,533 | A * | 2/1931 | Parmele | A47G 33/06 174/152 G |
| 1,952,789 | A * | 3/1934 | Butts | E04H 12/2215 43/25 |
| 2,263,061 | A * | 11/1941 | Allen | B60Q 3/43 362/311.06 |
| 2,648,152 | A * | 8/1953 | Simpson | G09F 7/02 D18/26 |
| 2,797,310 | A * | 6/1957 | Moore | F21V 21/0824 362/293 |
| 3,011,743 | A * | 12/1961 | Heath | H01R 33/00 248/27.1 |
| 3,078,367 | A * | 2/1963 | Jackson | F21V 21/0885 24/511 |
| 3,090,115 | A * | 5/1963 | Carr | B25B 27/0028 411/509 |
| 3,197,629 | A * | 7/1965 | Williams | F21V 19/00 362/216 |
| 3,229,939 | A * | 1/1966 | Hubbard | F21V 17/168 439/550 |
| 3,360,224 | A * | 12/1967 | Baumann, Jr. | A01K 97/10 248/156 |
| 3,383,675 | A * | 5/1968 | Carrothers | G09F 21/02 362/186 |

(Continued)

*Primary Examiner* — Peggy A Neils
*Assistant Examiner* — James M Endo
(74) *Attorney, Agent, or Firm* — Daniel M. Cohn; Howard M. Cohn

(57) ABSTRACT

A device for mounting a light bulb and bulb base to a ground stake having a mounting ring for attaching a bulb and a bulb base to the ground stake. A sealing ring is disposed in the mounting ring having the bulb received in an upper end of the sealing ring and the bulb base secured to the lower end of the sealing ring whereby the sealing ring restricts moisture from flowing around the bulb and into the bulb base when the bulb is screwed into the sealing ring.

10 Claims, 3 Drawing Sheets

(56) References Cited

U.S. PATENT DOCUMENTS

| | | | | | |
|---|---|---|---|---|---|
| 3,540,687 | A * | 11/1970 | Cuva | F21V 21/088 | 248/223.41 |
| 4,550,451 | A * | 11/1985 | Hubbard | E03C 1/021 | 248/68.1 |
| 4,967,329 | A * | 10/1990 | Tatavoosian | F21V 17/16 | 362/240 |
| 5,142,461 | A * | 8/1992 | Nugent | F21V 21/0832 | 362/396 |
| 5,178,454 | A * | 1/1993 | Lai | F21V 21/116 | 362/396 |
| 5,361,195 | A * | 11/1994 | Chen | F21V 21/092 | 362/101 |
| 5,386,356 | A * | 1/1995 | Davis, Jr. | F21S 8/081 | 362/267 |
| 5,597,229 | A * | 1/1997 | Plichta | F21S 4/10 | 362/153.1 |
| 5,667,174 | A * | 9/1997 | Adams | A45F 3/44 | 248/156 |
| 5,667,296 | A * | 9/1997 | Cheng | F21V 31/00 | 362/267 |
| 5,842,773 | A * | 12/1998 | Krebs | F21S 4/20 | 362/396 |
| 5,911,501 | A * | 6/1999 | Katz | F21V 21/0824 | 362/267 |
| 6,015,218 | A * | 1/2000 | Snell | B44F 3/00 | 362/249.14 |
| 6,095,847 | A * | 8/2000 | Lin | F21V 19/006 | 439/280 |
| 6,116,760 | A * | 9/2000 | Cox | F21V 21/0824 | 362/396 |
| 6,227,845 | B1 * | 5/2001 | Pillow | F21L 17/00 | 362/159 |
| 6,328,459 | B1 * | 12/2001 | Adams | F16L 3/237 | 362/396 |
| 6,398,391 | B1 * | 6/2002 | Huang | F21V 21/116 | 362/267 |
| 6,461,018 | B1 * | 10/2002 | Chanslor | F21S 6/001 | 362/431 |
| 6,474,842 | B2 * | 11/2002 | Shieh | F21V 21/088 | 362/396 |
| 6,626,553 | B2 * | 9/2003 | Zhao | F21S 4/20 | 362/124 |
| 6,949,718 | B1 * | 9/2005 | Hockenberry | H05B 3/0033 | 219/521 |
| 7,244,044 | B2 * | 7/2007 | Liao | G09F 13/22 | 40/550 |
| 8,646,957 | B2 * | 2/2014 | Johnson | B60Q 1/32 | 362/477 |
| 9,470,392 | B2 * | 10/2016 | Santiago | F21V 1/22 | |
| 10,156,777 | B1 * | 12/2018 | Altamura | F21S 4/10 | |
| 2003/0209963 | A1 * | 11/2003 | Altgilbers | F21V 19/007 | 313/318.01 |
| 2005/0276078 | A1 * | 12/2005 | Halter | F21S 4/10 | 362/653 |
| 2007/0285915 | A1 * | 12/2007 | Rosenau | F21V 31/005 | 362/101 |
| 2013/0294057 | A1 * | 11/2013 | Schwartz | F21L 4/08 | 362/311.06 |
| 2015/0144760 | A1 * | 5/2015 | Paradiso | F16M 13/022 | 248/534 |
| 2016/0025309 | A1 * | 1/2016 | Zhang | F21V 21/0824 | 362/382 |
| 2018/0187867 | A1 * | 7/2018 | Adams, IV | F21V 21/0824 | |

* cited by examiner

CLIP AND SEAL HOLIDAY LIGHT GROUND STAKES

CROSS-REFERENCE TO RELATED APPLICATIONS

This application claims the benefit of U.S. Provisional Patent Application Ser. No. 63/188,037 filed on May 13, 2021, which is incorporated herein by reference.

FIELD OF INVENTION

The present invention relates generally to a clip and seal light ground stakes.

BACKGROUND OF INVENTION

Currently, there are a number of solutions for affixing Holiday Lights in the ground with a mounting device or type of stake. Some of these solutions attempt to provide an orderly and easy installation where the lights are straight once installed and stay straight over the Holiday season, but these solutions fail to meet the needs of the industry because: (1) they are impossible or exceedingly difficult to get straight upon installation; (2) they fail to stay straight over the course of the Holiday season; (3) they do not stay secured to the bulb bases when stored, creating additional costs in future years to reinstall the lights; (4) they do not provide any protection against water penetration to the bulb and bulb base connection; (5) the methods of attaching to the bulb base do not remain straight or even secure, causing the lights to become misaligned or to fall off altogether.

Other solutions attempt to make the lights line up straight when they are installed in the ground, but these solutions are similarly unable to meet the needs of the industry because the installation of the stakes is very time consuming and cumbersome.

Still, other solutions seek to hold the base in place to the stake over time, but these solutions also fail to meet industry needs because they put too much force on the electric wires at the bulb base, often causing the bulb base to separate from the electrical line requiring repairs and additional costs; they also have small tabs or parts that often break.

It would be desirable to have a device that functioned as a ground stake for Holiday Lights that provides moisture protection to the bulb and bulb base connection. Furthermore, it would also be desirable to have a device that is very easy to install. Still, further, it would be desirable to have a device that functioned as a ground stake for Holiday Lights that cannot be easily removed once installed, nearly eliminating operation type failures due to external forces. Therefore, there currently exists a need in the industry for a device that functions as a ground stake, provides moisture protection to the bulb and base, and cannot easily fall off of or be removed from the bulb and base once it is installed. Similarly, it would be desirable to have an associated method relating to the device that functions as a ground stake for Holiday Lights, that serves the function of a light clip or other mounting device, and that both attaches to and seals the connection of the bulb and base. Therefore, there currently exists a need in the industry for a process that provides a mounting device, moisture protection and an excellent connection to the bulb and base of Holiday Lights.

SUMMARY OF THE INVENTION

Disclosed herein is a Clip and Seal Holiday Light Ground Stake, which is made up of the following components: 1) A single structure formed in a plastic ring shaped device, which is held in place by the bulb and bulb base connection, and seals the light bulb and the bulb base connection; is integrated into the ring type structure; is softer than the inner ring; that provides a moisture seal at the bulb and bulb base; is attached to the mounting ring with a long plastic stake, which is designed to be placed into the ground while holding the bulb base and bulb above the ground at a desired distance above the ground.

These components are connected as follows: The ring and stake are formed in a single process that connects them as a single structure or device; the soft inner ring is attached to the mounting ring during or after the forming of the device. Similarly, the method consists of the following steps: a) the formation of any type of Holiday Light clip or attachment device that is secured to the bulb and bulb base while also forming a seal to protect against moisture penetration by the same ring type methodology. Depending on the type of medium to be attached do, the method could require modifications to attach to a gutter, shingles, a metallic structure, in the ground, on any structure, or anywhere Holiday Lights are typically installed.

According to the present invention there is disclosed a device for mounting a light bulb and a bulb base to a ground stake, comprising a mounting ring for attaching a bulb and a bulb base to the ground stake. A sealing ring is disposed in the mounting ring having the bulb received in an upper end of the sealing ring and the bulb base secured to the lower end of the sealing ring whereby the sealing ring restricts moisture from flowing around the bulb and into the bulb base when the bulb is screwed into the sealing ring.

Further, according to the present invention, the method of mounting a light bulb and a bulb base to a ground stake, includes the steps of: providing a mounting ring on the ground stake for attaching the bulb and the bulb base; placing a sealing ring in the mounting ring; placing the light bulb in an upper end of the sealing ring and the bulb base in the lower end of the sealing ring; and screwing the bulb into the bulb base whereby the sealing ring restricts moisture from flowing around the bulb and into the bulb base.

Still further, according to the present invention, a device for mounting a light bulb and a bulb base to a ground stake, comprises: a mounting ring for attaching a bulb and a bulb base to the ground stake; a sealing ring disposed in the mounting ring having the bulb received in an upper end of the sealing ring and the bulb base secured to the lower end of the sealing ring whereby the sealing ring restricts moisture from flowing around the bulb and into the bulb base when the bulb is screwed into the sealing ring; the sealing ring formed with upper and lower circular surfaces at opposite ends of a cylindrical opening extending therethrough; the upper and lower circular surfaces of the sealing ring are interconnected by a surface forming the cylindrical opening having a smaller diameter then the upper and lower circular surfaces; and an outer upper edge and a lower outer edge of the upper and lower circular surfaces, respectively, are spaced so that they can rest against an upper outer circular edge and a lower outer circular edge, respectively, of the mounting ring.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

Figure 1:
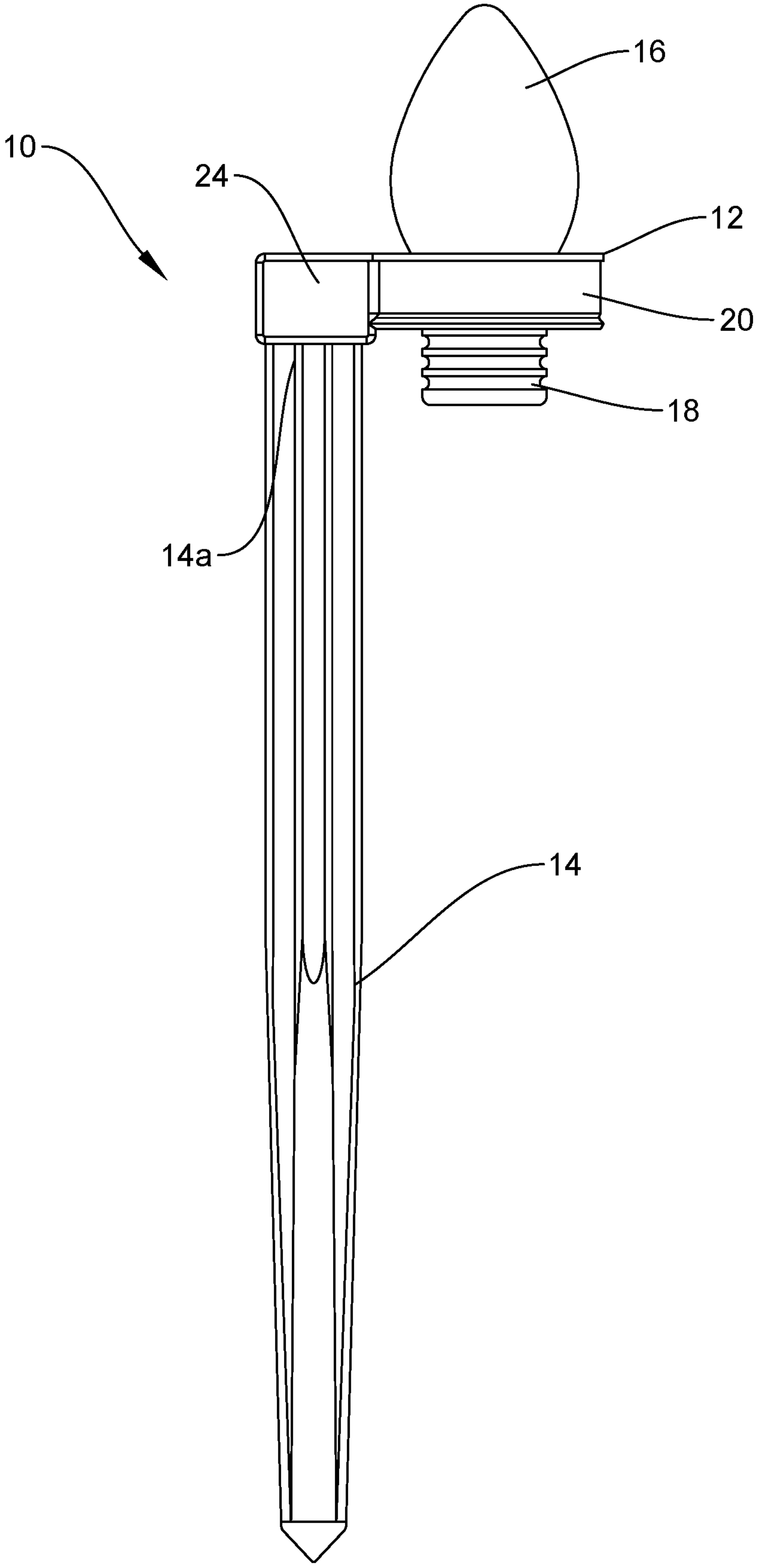

For the purpose of illustration, there are depicted in the drawings certain non-limiting embodiments of the invention. However, the invention is non-limited to the precise arrangements and instrumentalities of the embodiments depicted in the drawings. Reference numbers are used consistently among the Figures.

FIG. 1 is a diagram showing a side view of the ground stake device with the bulb and bulb holder, according to the present invention.

Figure 2:
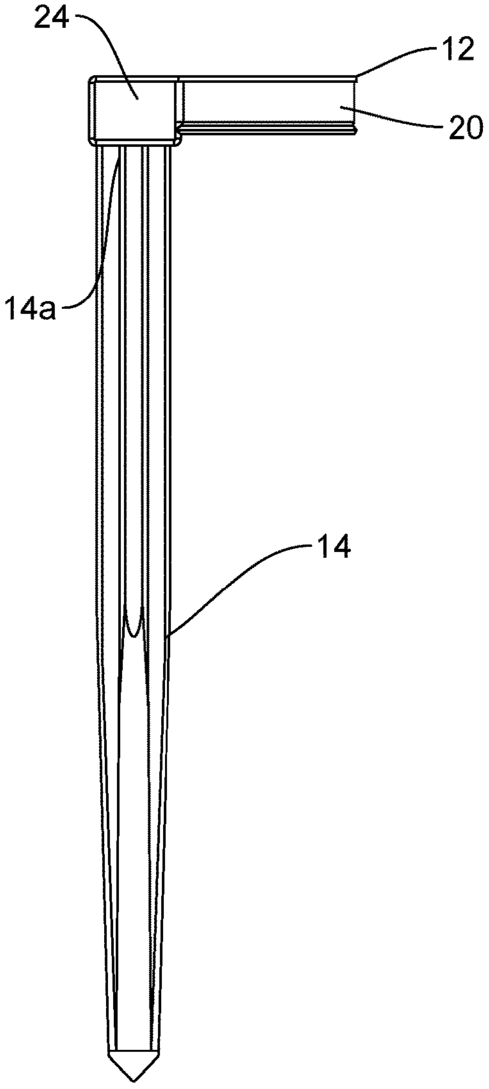

FIG. 2 is a diagram showing a side view of the ground stake device prior to mounting the bulb and bulb holder, according to the present invention.

Figure 3:
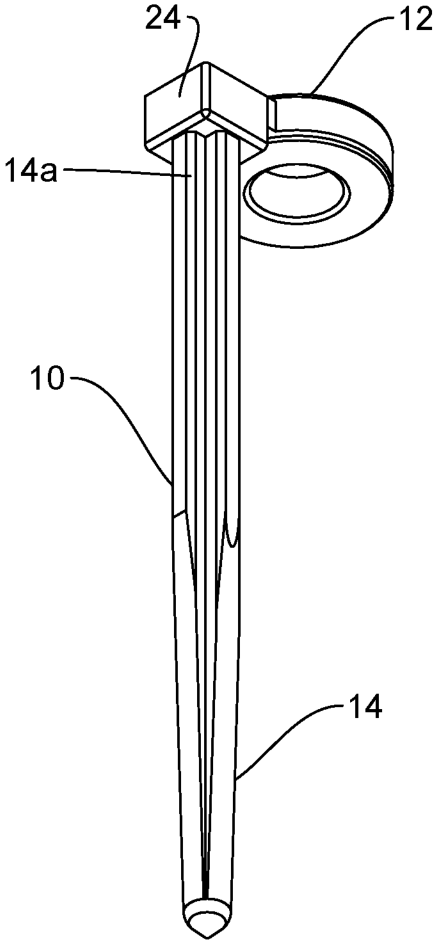

FIG. 3 is a diagram showing a rear elevational view, slightly from below, of the ground stake device prior to mounting the bulb and bulb holder, according to the present invention.

Figure 4:
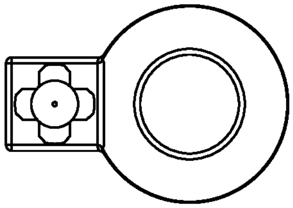

FIG. 4 is a diagram showing the top view of the ground stake device prior to mounting the bulb and bulb holder, according to the present invention.

Figure 5:
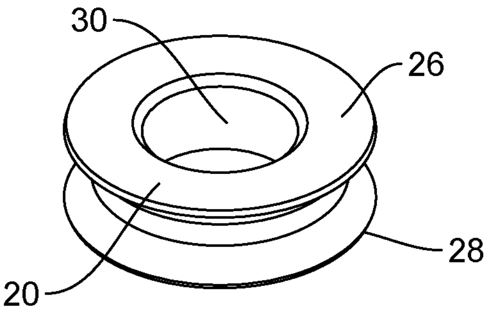

FIG. 5 is a diagram showing the top elevational view of a sealing ring, according to the present invention.

Figure 6:
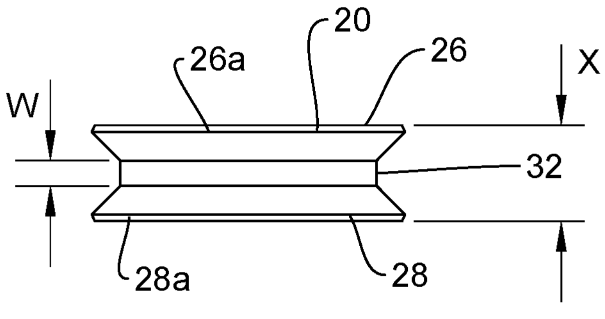

FIG. 6 is a diagram showing the side view of a sealing ring, according to the present invention.

Figure 7:
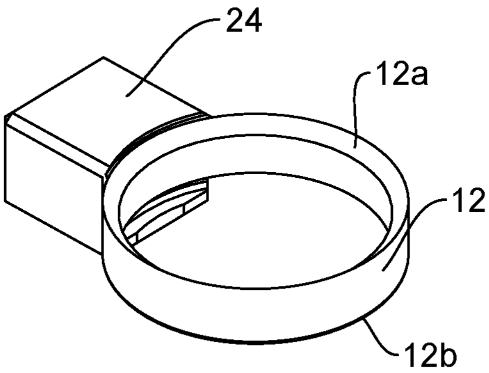

FIG. 7 is a diagram showing the front elevational view of a mounting ring, according to the present invention.

Figure 8:
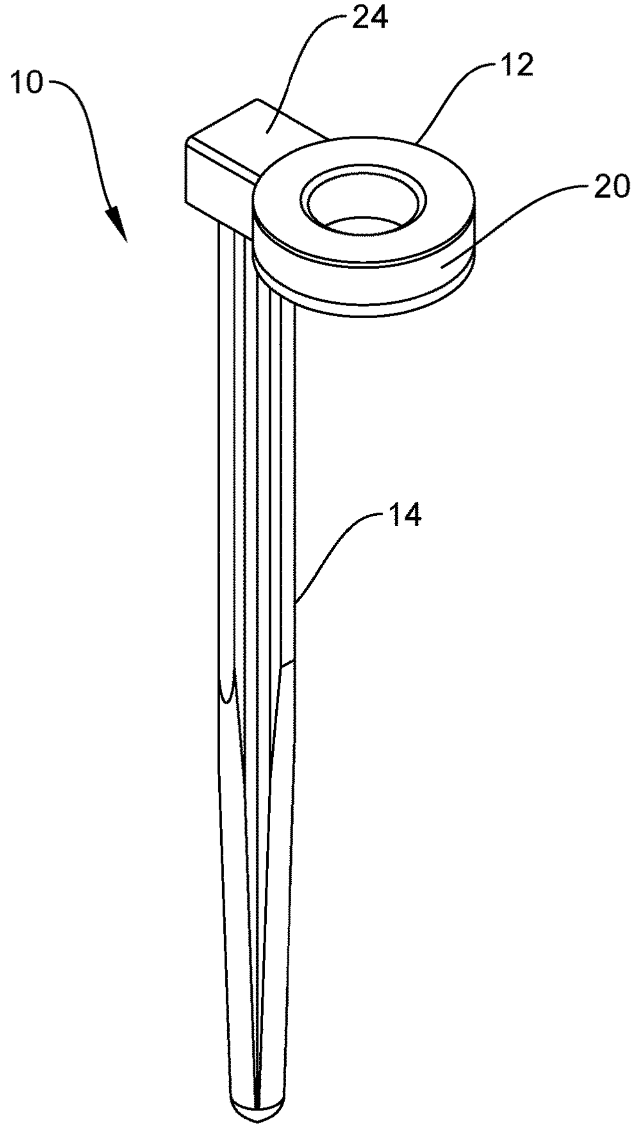

FIG. 8 is a diagram showing a front, elevational view, slightly from above, of the ground stake device, according to the present invention.

DETAILED DESCRIPTION OF THE PREFERRED EMBODIMENT

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The present invention is directed to a device 10 incorporating a clip and seal mounting ring 12 for mounting holiday lights 16 and a bulb base secured to a ground stake 14 as shown in FIG. 1. In its most complete form, the device 10 is made up of the following components: (1) a ground stake 14; (2) a mounting ring 12 that serves as both a mount for attaching the device to a bulb 16 and a bulb base 18 at the point of connection, and (3) a sealing ring 20 that is disposed in the mounting ring 12 and restricts moisture from weather or other sources from flowing into the bulb base 18. These components are connected as follows. The ground stake 14 and the mounting ring 12 can be formed together as a single device or structure 10. It should further be noted that the device 10 can be formed of a rigid, lightweight plastic material by, for example, an injection molding machine, and a silicone or rubber sealing ring 20 that is formed to fit inside the mounting ring 12. Once formed, the device 10 will be fixed and uniform.

A more detailed description of the assembling the disclosed device 10 consists of the following steps. First, a sealing ring 20, as shown in FIG. 5, that serves as a seal between the light bulb 16 to the bulb base 18, is inserted into a substantially cylindrically shaped mounting ring 12 that is secured onto a rectangularly shaped support structure 24 mounted to the upper end 14*a* of the ground stake 14, as shown in FIG. 3. The sealing ring 20 is formed with upper and lower circular surfaces 26 and 28, respectively, at opposite ends of a cylindrical opening 30 extending therethrough. The upper and lower circular surfaces 26 and 28 of the sealing ring 20 are interconnected by a surface 32 having a smaller diameter then the upper and lower circular surfaces 26 and 28. The surface 32 has a more narrow width w than the width x between the upper and lower circular surfaces 26 and 28. The edges 26*a* and 28*a* of the upper and lower circular surfaces 26 and 28 have a width so that they can rest against the circular edges 12*a* and 12*b* of the mounting ring 12, as shown in FIG. 7. The surface 32 interconnects the narrow width w with a flat surface extending between the section forming the narrow width w and the circular edges 12*a* and 12*b*.

The rectangularly shaped support structure 24 can serve as a mount for attaching any type of clip or any mounting device for Holiday Lights or other decorative string lighting, or individual light bases. It should further be noted that the clips or other mounting components will be formed with rigid, lightweight plastic material, such as by an injection molding device. A silicone or rubber ring 20 that is formed to be inserted and fit inside the mounting ring 12. Once the silicone or rubber ring 20 is inserted into the ring 12, a light bulb can be inserted into the top end of the rubber ring 12 and screwed into the bulb base 18 so that the rubber ring forms a seal between the threaded end of the bulb and the threaded interior of the bulb base.

The device 10 may also be constructed with one or more of the following features. (1) The ground stake 14 may be formed to accommodate many types of commercially available light bases including C9s, C1s and any miniature lights in any combination, to attach to the ground stake, at any location on the ground stake. (2) The ground stake 14 may allow or cause the bulb base 18 and the bulb 16 to project at a 45 degree, or other angle so as to point the light in a different direction other than perpendicular to the ground. (3) The ground stake 14 may allow or cause the bulb 16 and bulb socket 18 to be situated horizontally left or right, vertically up or down or perpendicular to the mounting clip and structure 24; (4) The ground stake 14 and mounting/sealing ring 12 may be formed from separate materials from one another or in any combination of materials. (5) The ground stake 14 and mounting/sealing ring 12 may be formed separately and connected together at a later time other than during the connection of the light bases 24 by any means such as snapping, locking, screwing or some other method to connect them. (6) The ground stake 14 and the mounting/sealing ring 12 may be connected at some point along the ground stake other than the top 14*a* of the ground stake. (7) The inner surface of the mounting sealing/ring 12 may be formed with different materials such as a silicone material for the inner surface and a rigid plastic for the outer surface of the ring. These materials can be formed in one or multiple processes. (8) The stake 14 that is used for ground contact, can be formed in any shape, with any number of sides, in any length and in any texture for various types of substrate which it is designed to be inserted. (9) The ground stake 14 and mounting/sealing ring 12 may designed in any fashion including but not limited to solid, hollowed out, flat, star shaped, curved, singular or made of multiple components. (10) The ground stake 14 and the mounting/sealing ring 12 may have one or more integrated or affixed reinforcements to increase strength the device 10. (11) The device 10, including the ground stake 14 and the mounting/sealing ring 12 may be formed from any of, but not limited to the following materials or combination of the following materials: HDPE, LDPE, PP, PE, POM, PA, PBT, PET, PFA, PVDF, PEEK, PPS, PTFE, ABS, PS, PMMA, PETG, PVC, PC, PUR/PU, PPSU, PEI, PSU, PAI, PBI or PI. (12) The device 10, including the ground stake 14 and the mounting/sealing ring 12 may be formed from any of, but not limited to the following materials or combination of the following rubber and silicone material: AFLAS, Butyl, Chloroprene, EPDM, Epichlorohydrin/ECO, Fluoroelastomer, Fluorosilicone, Hydrogenated nitrile, Hypalon, Karlez, Natural, Nitrile, Perfluoroelastomers/FFKM, Polyacrylic/ACM, Polyurethane EU or AU, Silicone rubber, styrene butadiene/SBR or vulcanized rubber. (13) The device 10 including the ground stake 14 and the mounting/sealing ring 12 may be formed by any, but not limited to the following methods or combination of the following construction methods: Plastic injection molding, Rotational molding, Extrusion blow molding, Injection blow molding, Reaction injection molding, Vacuum casting, Thermoforming or Compression molding. (14) The ground stake 14 and the mounting/sealing ring 12 may each be formed in any length or thickness. (15) The ground stake 14 may contain multiple points creating one or more protrusions for insertion into the ground. (16) The ground stake 14 and mounting/sealing ring 12 may have multiple and different types of light connecting clips (C9, C7, minis, etc.) on one or both sides of the mounting clip. (17) The ground stake 14 preferably provides a weather seal with all commercially available bulbs and bulb bases. (18) The ground stake 14 may be used in other applications other than going into the ground. (19) A part of the stake 14 may be curved to accommodate a round bulb base. (20) The device 10 may be formed into numerous colors or any combination of colors. (21) The device 10 and its components may be formed in any dimensions. (22) The device 10 may be formed in two or more separate processes. (23) The device 10 may be created with some commercially available sealant fabricated within the mold for the device. (24) The device 10 may be formed to allow the stake 14 to be hammered into the ground with the mounting/sealing ring 12 offset from the stake 14. (25) The device 10 may be formed with additional fittings for different types of lights and these fittings may or may not be removable. (26) The device 10 may be formed with a breakaway or permanent attachment that serves as a depth guide for uniform height installation into the ground. (27) The device may allow the mounting/sealing ring 12 to be a separate piece that attaches to the device during installation and may work with other similar devices.

The disclosed device 10 is unique when compared with other known devices and solutions because it provides: (1) both an attachment of and weather preventative seal to the bulb 16 and bulb base 18; (2) attachment to the bulb 16 and the bulb base 18 by installing the bulb, and does not require an extra step to install; (3) attachment more quickly and securely; (4) an absence of stress on the electrical wire, bulb or bulb base; (4) a secure fit that will not come detached from the bulb and bulb base unless the light bulb is removed from the base; (5) straight and orderly alignment consistently to each bulb and bulb base; and (6) the ability to install, use, remove and store the lights without risk of the stake coming apart from bulb and base during any of these steps.

Similarly, the associated method is unique in that it (1) attaches and seals bulb and bulb base to any mounting device or clip; (2) attaches bulb and bulb base more quickly and securely to any mounting device or clip; and (3) will not come off the bulb and base during application, use, removal or storage.

Similarly, the disclosed method is unique when compared with other known processes and solutions in that it: (1) secures to bulb and bulb base in a straight and orderly fashion; (2) saves time on installation as it is installed simultaneously with attaching bulb to bulb base; and (3) does not put stress on the wires, bulb or bulb base.

The disclosed device is unique in that it is structurally different from other known devices or solutions. More specifically, the device 10 is unique due to the presence of (1) an integrated seal that provides weather protection for the bulb and bulb base connection and attachment to the bulb and bulb base; (2) a round ring-like device formed at the top to secure the bulb and bulb base at the top of the bulb base, not the bottom or sides; and (3) a rigid, uniform construction without tabs or small parts or with parts that are designed to move or parts that could break or come loose.

Furthermore, the process associated with the aforementioned device 10 is likewise unique. More specifically, the disclosed process owes its uniqueness to the fact that it: (1) provides an integrated seal that provides weather protection for the bulb and 16 and the bulb base 18 connection and attachment to the bulb and bulb base; (2) utilizes a round ring like device 12 to secure the bulb and bulb base at the top of the bulb base, not the bottom or sides; and (3) is formed with a rigid, uniform construction without tabs or small parts, or with parts that are designed to move or parts that could break or come loose.

FIG. 1 is a diagram showing the ground stake 14 from the side. The ring like structure 12 for mounting the bulb 16 and bulb base is connected at the top 12*a* of the stake. The bottom end of the stake 14 then points downward, and is designed to penetrate the ground surface. The shape of the stake 14 is thicker at the top and thinner at the bottom making it easier to place in the ground.

FIG. 2 is a diagram showing the side of the stake 14 without the bulb 16 and the bulb base 18 as shown in FIG. 1. Inside of the mounting ring 12 is a downward facing sealing ring 20 that is designed to provide moisture penetration to a light bulb 16 and the bulb base 18. This is accomplished by placing a light bulb 16 above the mounting ring 12, and a light base 18 on an electrical line below the ring. As a bulb 16 is secured into a light base 18, they compress the upper and lower circular surfaces 26 and 28 of the sealing ring together so that they rest against the circular edges 12_a_ and 12_b_ of the mounting ring 12. This ring 12 is connected to the stake 14 as a uniform structure. The stake 14 can be placed into the ground, while holding a light bulb and base in place. When installed, a bulb will point upward and maintain the same uniform direction with multiple lights placed together.

FIG. 3 is a diagram showing the stake 14 from the right side. Here the sealing ring 20 can be seen protruding downward beneath the thick mounting ring 12 above it. The inner part of the sealing ring 20 forms the seal with a bulb and bulb base. The outer part of the mounting ring holds a bulb and bulb base in place. The mounting ring is connected to the stake which is placed in the ground sequentially with other bulbs and bulb bases on a string of lights. The sealing ring 20 that seals a bulb to a bulb base 18 or socket fits inside of the top of a bulb base by placing a bulb base beneath the mounting ring 12. A bulb 16 is installed above the mounting ring 12 and the tension between the bulb and a bulb base seals the connection and secures a bulb and bulb base to the stake.

FIG. 4 is a diagram of the stake 14 from the top. The outer part of the ring 12 functions as the connector to the stake. The inner part of the ring forms the seal with a bulb and a bulb base.

FIG. 5 is a diagram of sealing ring 20 from the top. The outer part of the sealing ring functions as the connector to the sealing ring 12. The inner part of the ring forms the seal with a bulb and a bulb base.

FIG. 6 is a side view of the sealing ring 20. The sealing ring 20 is formed as a flange to go inside of the sealing ring 12 and is in the same shape as the bottom of a bulb. This forms the weather preventative seal that restricts moisture from entering a bulb base at this point of connection.

FIG. 7 is a diagram of the mounting ring 12 prior to placing the sealing ring 20 therein.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A device for mounting a light bulb and a bulb base to a ground stake, comprising:

a mounting ring for attaching the bulb and the bulb base to the ground stake, the mounting ring having upper and lower circular surfaces interconnected by an inner surface that extends between the upper and lower circular surfaces;

the mounting ring having first and second circular edges between the upper and lower circular surfaces and the inner surface;

a sealing ring disposed in the inner surface of the mounting ring whereby the bulb is received in the inner surface of the mounting ring at an upper end of the sealing ring and the bulb base is secured to the inner surface of the mounting ring at a lower end of the sealing ring whereby the sealing ring restricts moisture from flowing around the bulb and across the inner surface of the mounting ring to the bulb base when the bulb is screwed into the inner surface of the sealing ring;

the sealing ring is formed with upper and lower circular surfaces at opposite ends of the inner surface of the sealing ring forming a cylindrical opening extending therethrough and wherein the upper and lower circular surfaces at the opposite ends of the inner surface of the sealing ring are interconnected by a circular outer surface extending between the upper and lower circular surfaces and wherein the upper and lower circular outer surfaces each has a flat surfaces extending between a narrow section of the circular outer surface having a narrow width as compared with a diameter of the upper and lower circular edges of the mounting ring;

the inner surface of the sealing ring having a smaller diameter than an inner diameter of the inner surface of the upper and lower circular surfaces of the mounting ring;

wherein the inner surface interconnecting the upper and lower circular outer surfaces of the sealing ring has a more narrow diameter than the diameter between the upper and lower circular outer surfaces of the mounting ring;

the sealing ring has an outer surface extending between the outer edges of the upper and lower circular outer surfaces of the sealing ring and interconnected by an intermediate surface having a smaller diameter than the outer edges of the upper and lower circular outer surfaces of the mounting ring;

wherein the outer edges of the upper and lower circular outer surfaces of the sealing ring are spaced so that they can rest against the circular edges of the mounting ring; and wherein the outer edges of the upper and lower circular outer surfaces of the sealing ring have a width so that they can rest against the circular edges of the mounting ring.

2. The device set forth in claim 1 wherein the device is formed of a rigid, lightweight plastic material.

3. The device set forth in claim 1 wherein the sealing ring is formed to fit inside the mounting ring.

4. The device set forth in claim 3 wherein the sealing ring is formed of silicone or rubber.

5. The device set forth in claim 4 wherein a rectangularly shaped support structure disposed at an upper end of the ground stake provides a mount for the mounting ring.

6. The device as set forth in claim 5 wherein the ground stake and the mounting ring allows the bulb base and the light bulb to project in a different direction other than perpendicular to the ground.

7. The device as set forth in claim 6 wherein the ground stake and the mounting ring is formed of the following materials or combination of the following materials selected from the group consisting of HDPE, LDPE, PP, PE, POM, PA, PBT, PET, PFA, PVDF, PEEK, PPS, PTFE, ABS, PS, PMMA, PETG, PVC, PC, PUR/PU, PPSU, PEI, PSU, PAI, PBI and PI.

8. The device as set forth in claim 6 wherein the ground stake and the mounting ring is formed of the following materials or combination of the following materials selected from the group consisting of rubber and silicone material: AFLAS, Butyl, Chloroprene, EPDM, Epichlorohydrin/ECO, Fluoroelastomer, Fluorosilicone, Hydrogenated nitrile, Hypalon, Karlez, natural rubber, Nitrile, Perfluoroelastomers/FFKM, Polyacrylic/ACM, Polyurethane EU or AU, Silicone rubber, styrene butadiene/SBR and vulcanized rubber.

9. The device as set forth in claim 6 wherein the ground stake and the mounting ring is formed of the following materials or combination of the following materials selected from the group consisting of rubber and a silicone material.

10. The device as set forth in claim 6 wherein the ground stake and the mounting is constructed by the plastic injection molding, rotational molding, extrusion blow molding, injection blow molding, reaction injection molding, vacuum casting, thermoforming or Compression molding.

* * * * *